United States Patent
Nuechterlein et al.

(10) Patent No.: US 6,594,755 B1
(45) Date of Patent: Jul. 15, 2003

(54) SYSTEM AND METHOD FOR INTERLEAVED EXECUTION OF MULTIPLE INDEPENDENT THREADS

(75) Inventors: David W. Nuechterlein, Longmont, CO (US); Willard S. Briggs, Boulder, CO (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/477,512

(22) Filed: Jan. 4, 2000

(51) Int. Cl.[7] ............................... G06F 9/44; G06F 9/38
(52) U.S. Cl. ...................... 712/239; 712/219; 712/245; 712/240; 709/107
(58) Field of Search .................... 712/239, 233, 712/23, 219, 24, 236, 235, 245, 228, 240; 709/315, 108, 106, 107

(56) References Cited

U.S. PATENT DOCUMENTS 3,577,189 A * 5/1971 Cocke et al. ................ 712/219
5,881,277 A * 3/1999 Bondi et al. ................. 712/239

* cited by examiner

Primary Examiner—Daniel H. Pan

(57) ABSTRACT

There is disclosed an apparatus for loading instructions into the instruction execution pipeline of a pipelined processor. The apparatus for loading instructions comprises: 1) an instruction loading circuit that loads instructions from a first instruction thread into the instruction execution pipeline; and 2) a branch instruction detection circuit that detects a branch instruction in the first instruction thread. In response to the branch instruction detection, the instruction loading circuit stops loading instructions from the first instruction thread into the instruction execution pipeline and begins loading instructions from a second instruction thread into the instruction execution pipeline.

20 Claims, 3 Drawing Sheets

SYSTEM AND METHOD FOR INTERLEAVED EXECUTION OF MULTIPLE INDEPENDENT THREADS

TECHNICAL FIELD OF THE INVENTION

The present invention is directed, in general, to processing systems and, more specifically, to a microprocessor that is capable of processing multiple independent threads of instruction code.

BACKGROUND OF THE INVENTION

The demand for faster computers demands that state-of-the-art microprocessors execute instructions in the minimum amount of time. Over the years, microprocessor speeds have been increased in a number of different ways, including increasing the speed of the clock that drives the processor, reducing the number of clock cycles required to perform a given instruction, and reducing the number of gate delays incurred while executing an instruction.

Microprocessor speeds have also been increased by means of one or more instruction pipelines. An instruction pipeline is a series of separate instruction processing stages. Each stage is independent and is optimized to perform a specific portion of the overall instruction processing. Thus, instructions may be fed into the first stage of the pipeline and each stage performs a specific portion of the instruction, much like an assembly line. Preferably it is not necessary for one instruction to finish processing before the next instruction is loaded into the pipeline. Thus, multiple instructions may be loaded into the instruction pipeline. For example, a five stage instruction pipeline may contain up to five instructions at one time.

The instruction pipeline concept has been extended even further to multiple pipeline architectures. In a multiple pipeline architecture, a complex instruction decoder feed instructions to two or more instruction pipelines. The complex instruction decoder may select a particular pipeline based on which instructions are already in each pipeline and how fast the instructions are expected to flow through the remaining pipeline stages.

However, there are limitations to the improvements that may be provided by single and multiple instruction pipelines. Going from single to multiple instruction pipelines has diminishing returns as the number of instruction pipeline grows. Branch (or "change of flow") instructions make it difficult to decode many instructions in parallel. Conditional branch instructions cause problems with pipelines because the next instruction to be loaded into the pipeline cannot be determined until after the branch is resolved. Traditional solutions to this problem generally revolve around inserting more logic to do branch predictions and then speculatively executing the predicted path until the branch is resolved. This is done to maximize processor throughput.

However, if small size and low power are important, branch prediction techniques have significant drawbacks. A large amount of high speed circuitry is required, which is expensive in both area and power consumption. In addition, speculative execution wastes power if the predicted path turns out to be wrong and the speculative execution is flushed. Furthermore, data dependencies can serialize the use of execution units. As a result, in conventional microprocessors containing, for example, four instruction pipelines, the fourth pipeline may be used less than five percent (5%) of the time in some applications.

Therefore, there is a need in the art for improved microprocessors that have a higher throughput rate. In particular, there is a need in the art for improved microprocessors that include multiple instruction pipelines. More particularly, there is a need in the art for multiple instruction pipeline microprocessors that more efficiently use the available instruction pipelines and that are less susceptible to stalls caused by branch (change-of-flow) instructions and data dependencies.

SUMMARY OF THE INVENTION

The limitations inherent in the prior art described above are overcome by the present invention which provides, for use in a pipelined processor comprising an instruction execution pipeline, an apparatus for loading instructions into the instruction execution pipeline. In an advantageous embodiment of the present invention, the apparatus for loading instructions comprises: 1) an instruction loading circuit capable of loading instructions from a first instruction thread into the instruction execution pipeline; and 2) a branch instruction detection circuit capable of detecting a branch instruction in the first instruction thread and, in response to the detection, causing the instruction loading circuit to stop loading instructions from the first instruction thread into the instruction execution pipeline and causing the instruction loading circuit to begin loading instructions from a second instruction thread into the instruction execution pipeline.

The present invention takes advantage of the fact that two separate threads of code are normally running in a data processing system. Thus, instead of building the extra circuitry needed to predict a branch destination in a first thread of code, the branch instruction is resolved during normal execution and useful work is done in the meantime on the second thread of code.

In one embodiment of the present invention, the apparatus for loading instructions further comprises a first state table capable of storing first state information associated with the first instruction thread and a second state table capable of storing second state information associated with the second instruction thread.

In another embodiment of the present, invention, the instruction execution pipeline comprises a plurality of execution units capable of selecting and retrieving the first state information from the first state table and using the first state information to execute instructions in the first instruction thread.

In still another embodiment of the present invention, the plurality of execution units selects and retrieves the first state information according to at least one thread status bit associated with the instructions in the first instruction thread.

In yet another embodiment of the present invention, the instruction execution pipeline comprises a plurality of execution units capable of selecting and retrieving the second state information from the second state table and using the second state information to execute instructions in the second instruction thread.

According to a further embodiment of the present invention, the plurality of execution units selects and retrieves the second state information according to at least one thread status bit associated with the instructions in the second instruction thread.

According to a still further embodiment of the present invention, the instruction execution pipeline comprises an address generation circuit capable of selecting and retrieving addresses from the first state information and from the second state information according to at least one thread status bit associated with the instructions in the first and second instruction threads.

According to a yet further embodiment of the present invention, the branch instruction detection circuit is further capable of detecting a branch instruction in the second instruction thread and, in response to the detection, causing the instruction loading circuit to stop loading instructions from the second instruction thread into the instruction execution pipeline and causing the instruction loading circuit to begin loading instructions from the first instruction thread into the instruction execution pipeline.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
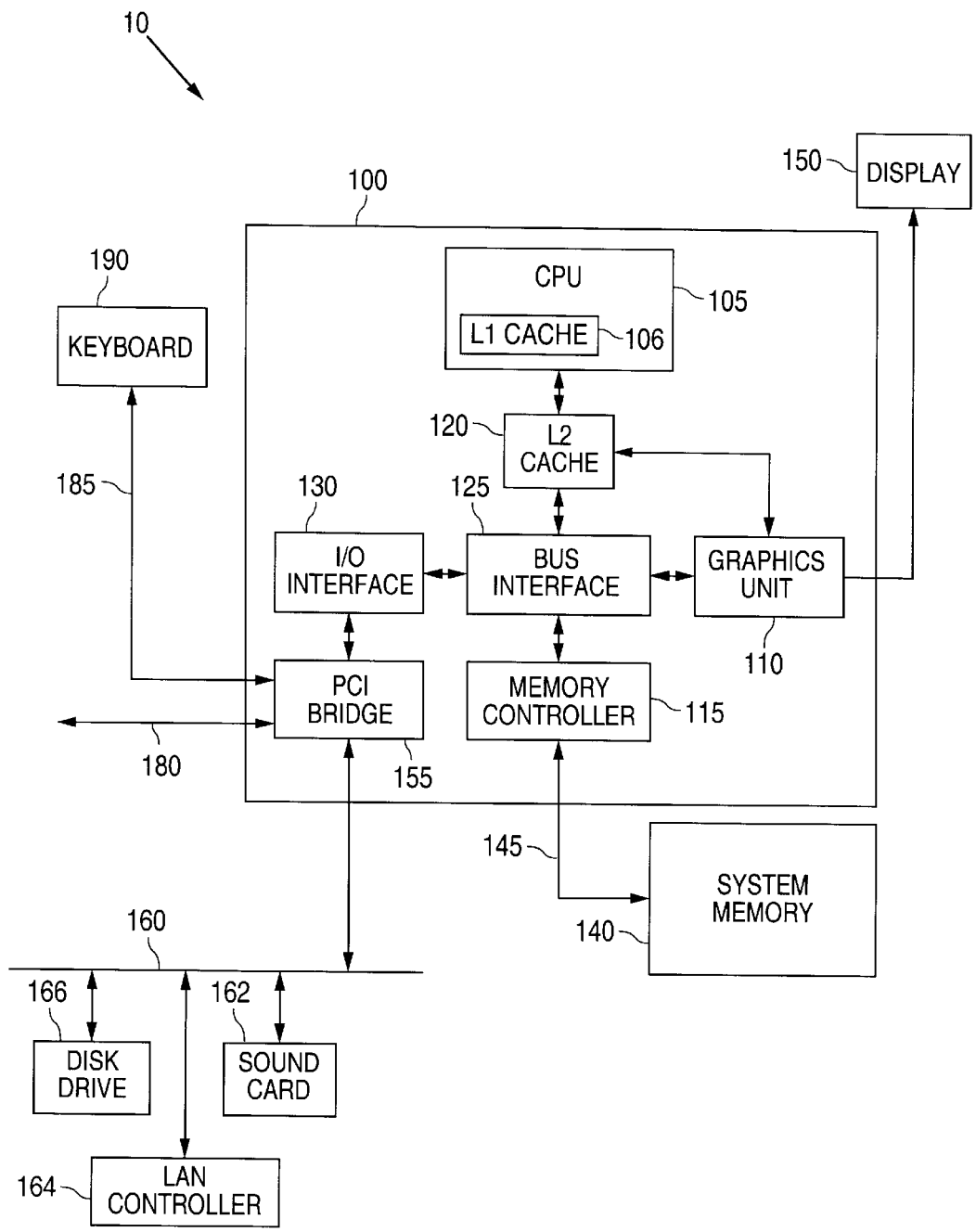
FIG. 1 is a block diagram of an exemplary processing system, which includes an integrated microprocessor according to one embodiment of the present invention.
Figure 2:
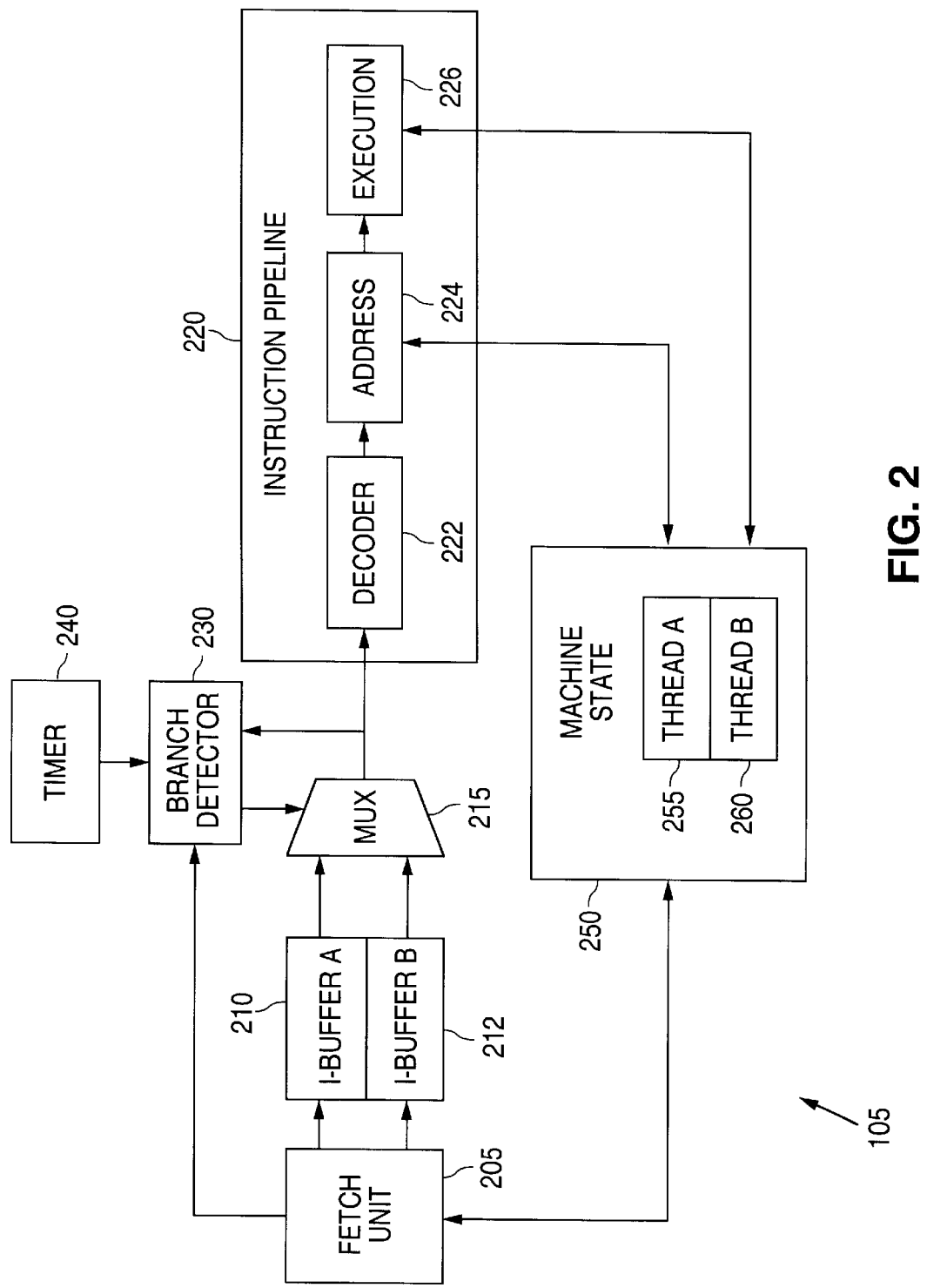
FIG. 2 illustrates selected portions of the exemplary integrated microprocessor in FIG. 1, including a central processing unit (CPU) in accordance with the principles of the present invention.
Figure 3:
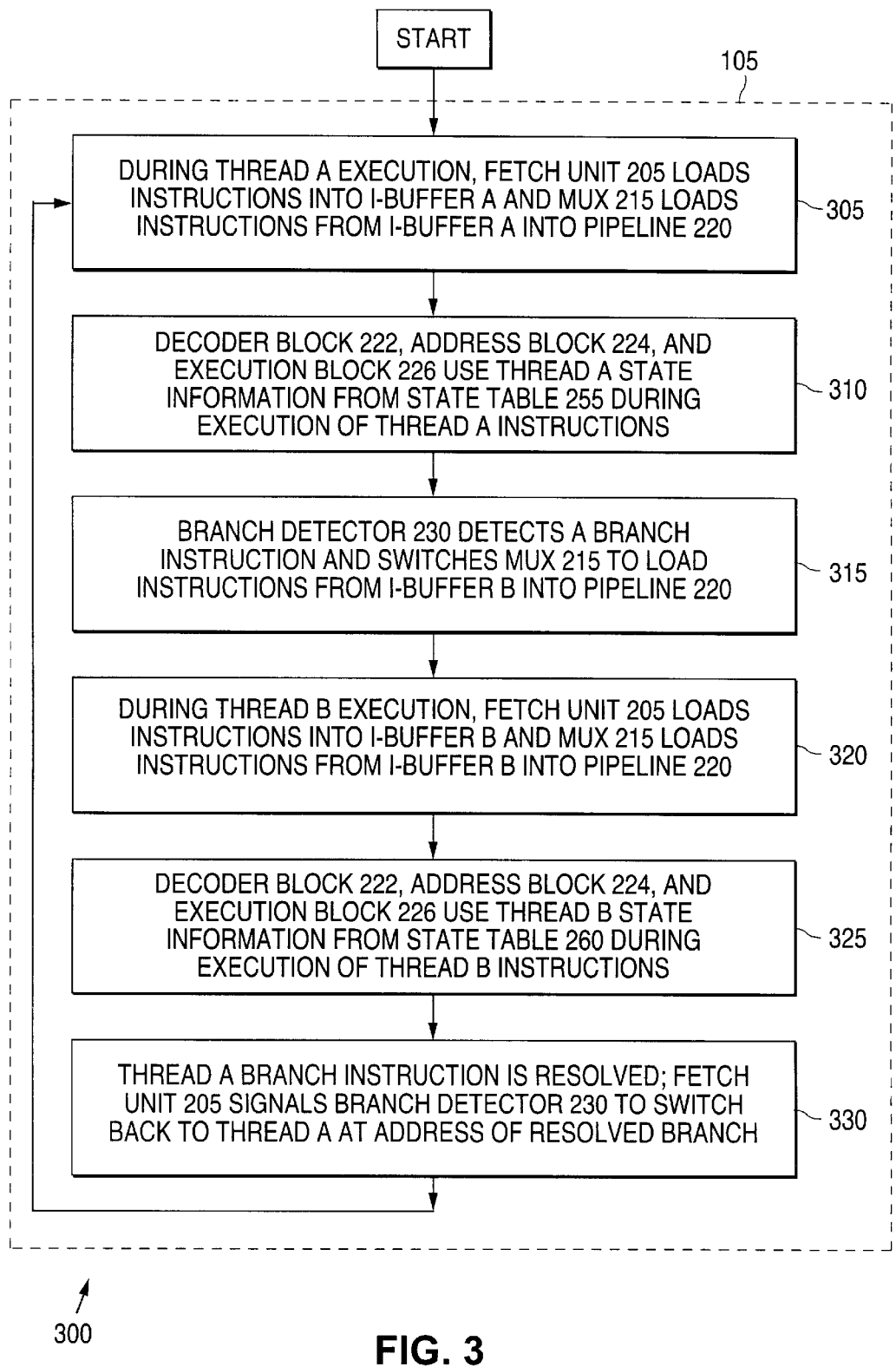
FIG. 3 is a flow chart illustrating the operation of the exemplary CPU in FIG. 3 according to one embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged processing system.

FIG. 1 is a block diagram of processing system 10, which includes integrated microprocessor 100, according to one embodiment of the present invention. Integrated microprocessor 100 comprises central processing unit (CPU) 105, which may have dual integer and dual floating point execution units, separate load/store and branch units. CPU 105 also comprises L1 cache 106.

Microprocessor 100 also comprises graphics unit 110, system memory controller 115, and L2 cache 120, which is shared by CPU 105 and graphics unit 110. Graphics unit 110, system memory controller 115, and L2 cache 120 may be integrated onto the same die as microprocessor 105. Bus interface unit 125 connects CPU 105, graphics unit 110, and L2 cache 120 to memory controller 115. Bus interface unit 125 also may be integrated onto the same die as microprocessor 105.

Integrated memory controller 115 bridges microprocessor 100 to system memory 140, and may provide data compression and/or decompression to reduce bus traffic over external memory bus 145 which preferably, although not exclusively, has a RAMbus™, fast SDRAM or other type protocol. Integrated graphics unit 110 provides TFT, DSTN, RGB, or other types of video output to drive display 150.

Bus interface unit 125 connects microprocessor 100 through I/O interface 130 to PCI bridge 155, which has a conventional peripheral component interconnect (PCI) bus interface on PCI bus 160 to one or more peripherals, such as sound card 162, LAN controller 164, and disk drive 166, among others. Bus interface unit 125 also connects fast serial link 180 and relatively slow I/O port 185 to microprocessor 100 (via I/O interface 130 and PCI bridge 155). Fast serial link 180 may be, for example, an IEEE 1394 bus (i.e., "Firewire") and/or a universal serial bus ("USB"). I/O port 185 is used to connect peripherals to microprocessor 100, such as keyboard 190 and/or a mouse. In some embodiments, PCI bridge 155 may integrate local bus functions such as sound, disk drive control, modem, network adapter, and the like.

FIG. 2 illustrates selected portions of central processing unit (CPU) 105, according to one embodiment of the present invention. CPU 105 comprises fetch unit 205, a pair of instruction buffers 210 and 212, multiplexer (MUX) 215, and instruction pipeline 220. Instruction pipeline comprises instruction decoder block 222, address generation block 224, and execution block 226. CPU 105 further comprises branch detector 230, timer 240 and machine state block 250.

A single fetch unit, fetch unit 205, fills two instruction buffers 210 and 212 (referred to hereafter as I-buffer A and I-buffer B, respectively) with instruction streams from two separate threads of code (Thread A and Thread B) pointed to by two instruction pointers, IPA and IPB, respectively. Instruction pointers IPA and IPB, among other things, are stored in state table 255 (labeled Thread A in FIG. 2) and state table 260 (labeled Thread B state in FIG. 2) in machine state block 250.

State table 255 comprises a group of registers for storing all of the state data associated with Thread A. Similarly, state table 260 comprises a group of registers for storing all of the state data associated with Thread B. The number of machine state registers associated with each thread depends on the number of capabilities to be provided for the second thread.

For example, in a typical x86 architecture, separate registers would be provided for each code thread for the Instruction Pointer (EIP), General Registers (EAX, EBX, ECX, EDX, EBP, ESP, ESI, and EDI) and flag register (EFLAGS). Two copies of the memory management registers would not be required if Thread B was defined to use flat non-segmented addressing scheme.

The output of one of I-buffer A and I-buffer B is selected by MUX 215, which then drives the instruction stream for the selected thread into instruction pipeline 220. Instruction decoder block 222 decodes the incoming stream of instructions for subsequent execution in execution block 226. Address generation block 224 generates addresses associated with memory reference instructions (e.g., register-memory instructions), including performing linear address calculations and physical (paged) address translations. Execution block 226 includes the execution units of CPU 105, including, for example, a floating point unit, an integer unit, and a load/store unit. Both address generation block 224 and execution block 226 are capable of accessing and modifying the values stored in state table 255 and state table 260.

Added to each instruction in each instruction stream is a thread status bit which specifies which thread (Thread A or Thread B) is currently being executed. Each one of instruction decoder block 222, address generation block 224, and execution block 226 uses the status bit to determine which set of state registers (i.e., state table 255 or state table 260) in machine state block 250 should be used to execute a pending instruction. The thread status bit may be added by fetch unit 205 or by I-buffer A and I-buffer B.

For example, if the thread status bit is Logic 0, then the state registers associated with Thread A are used. If the thread status bit is Logic 1, then the state registers associated with Thread B are used. In alternate embodiments of the present invention, more than two independent threads may be supported by the use of additional state tables in machine state block 250. In such embodiments, two or more thread status bits may be used to indicate the correct set of state registers associated with a pending instruction.

The output of MUX 215 is also applied to branch detector 230, which controls whether MUX 215 selects I-buffer A or I-buffer B. When branch detector 230 detects a branch instruction in Thread A, the branch instruction is loaded into instruction pipeline 220 and then MUX 215 is switched so that code from I-buffer B is fed into instruction pipeline 220. Code from Thread B continues to be fed into instruction pipeline 220 until the branch instruction from Thread A is finally resolved in execution block 226. At that time, fetch unit 205 sends a control signal to branch detector 230 causing branch detector 230 to switch MUX 215 back to feeding instructions from Thread A back into instruction pipeline 220. If a branch is taken, I-buffer A is loaded with new instruction starting at the taken branch address.

According to one embodiment of the present invention, a foreground process associated with Thread A has higher priority and a background process associated with Thread B has a lower priority. Normally, Thread B instructions are executed only when Thread B can steal unused cycles from Thread A. Since it is very possible that Thread B requires some minimum amount of processor time, timer 240 is provided to cause branch detector 230 to switch from Thread A to Thread B if Thread B is not getting an adequate amount of processing time by stealing cycles. In an advantageous embodiment of the present invention, timer 240 is a programmable timer that Thread B can control, allowing Thread B to use more execution time if Thread B is getting behind.

In an alternate embodiment of the present invention, the processes associated with Thread A and Thread B may have equal priority and timer 240 may be programmed to divide processor time roughly equally between Thread A and Thread B. In such an embodiment, instruction execution may switch upon detection of a branch instruction from Thread A to Thread B or from Thread B to Thread A. For example, if timer 240 causes Thread B to be executed and a branch instruction is detected in Thread B, branch detector 230 will begin loading Thread A instructions into pipeline 220. Subsequently, if timer 240 causes Thread A to be executed and a branch instruction is detected in Thread A, branch detector 230 will begin loading Thread B instructions into pipeline 220.

FIG. 3 depicts flow chart 300, which illustrates the operation of CPU 105 according to one embodiment of the present invention. Initially, Thread A instructions are being executed. Therefore, fetch unit 205 loads instructions into I-buffer A and MUX 215 loads instructions from I-buffer A into pipeline 220 (process step 305). As the Thread A instructions move through pipeline 220, decoder block 226, address block 224, and execution block 226 use Thread A state information from state table 255 based on the value of the at least one thread status bit(s) associated with the Thread A instructions (process step 310).

Eventually, branch detector 230 detects a branch instruction in Thread A and switches MUX 215 to begin loading Thread B instructions (process step 315). Thereafter, fetch unit 205 loads instructions into I-buffer B and MUX 215 loads instructions from I-buffer B into pipeline 220 (process step 320). As the Thread B instructions move through pipeline 220, decoder block 226, address block 224, and execution block 226 use Thread B state information from state table 260 based on the value of the at least one thread status bit(s) associated with the Thread B instructions (process step 325).

Eventually, the Thread A branch instruction is resolved. Fetch unit 205 receives the resolved branch address, loads it into I-buffer A, and signals branch detector 230 to switch MUX 215 back to Thread A at the resolved branch address (process step 330). Thereafter, Thread A execution resumes as before (process step 305).

In an exemplary embodiment of the present invention, one or more of the additional instruction decoder pipelines may be a dedicated instruction decoder pipeline that is capable of decoding only a subset of the instructions executable by CPU 305. For example, if CPU 305 is an x86 based microprocessor, fetch unit 315b and aligner 320b may be dedicated to decoding only certain types of x86 instructions.

In another exemplary embodiment of the present invention, CPU 105 may alternate between Thread A and Thread B in response to other types of stalls in addition to branch instructions. For example, branch detector 230 may receive a Cache Miss signal from L1 cache 106 and L2 cache 120. The Cache Miss signal has a similar effect to the detection of a branch instruction, namely, instructions from the current thread are no longer fetched and instructions from a different thread are loaded into instruction pipeline 220. Additionally, on a Cache Miss, all of the machine state data for each stage in instruction pipeline 220 is saved to state table 255 or state table 260. This is because a Cache Miss is not generated until near the end of instruction pipeline 220 and all of the instructions in process in instruction pipeline 220 must be saved for later execution.

Although the present invention has been described in detail, those skilled in the art should understand that they can make various changes, substitutions and alterations herein without departing from the spirit and scope of the invention in its broadest form.

What is claimed is:

1. For use in a pipelined processor comprising an instruction execution pipeline, an apparatus for loading instructions into said instruction execution pipeline comprising:
   an instruction loading circuit capable of loading instructions from a first instruction thread into said instruction execution pipeline; and
   a branch instruction detection circuit capable of detecting a branch instruction in said first instruction thread and, in response to said detection, causing said instruction loading circuit to stop loading instructions from said first instruction thread into said instruction execution pipeline and causing said instruction loading circuit to begin loading instructions from a second instruction thread into said instruction execution pipeline, wherein said second instruction thread is not a target of said branch instruction in said first instruction thread.

2. The apparatus for loading instructions as set forth in claim 1 further comprising a first state table capable of storing first state information associated with said first instruction thread and a second state table capable of storing second state information associated with said second instruction thread.

3. The apparatus for loading instructions as set forth in claim 2 wherein said instruction execution pipeline comprises a plurality of execution units capable of selecting and retrieving said first state information from said first state table and using said first state information to execute instructions in said first instruction thread.

4. The apparatus for loading instructions as set forth in claim 3 wherein said plurality of execution units selects and retrieves said first state information according to at least one thread status bit associated with said instructions in said first instruction thread.

5. The apparatus for loading instructions as set forth in claim 2 wherein said instruction execution pipeline comprises a plurality of execution units capable of selecting and retrieving said second state information from said second state table and using said second state information to execute instructions in said second instruction thread.

6. The apparatus for loading instructions as set forth in claim 5 wherein said plurality of execution units selects and retrieves said second state information according to at least one thread status bit associated with said instructions in said second instruction thread.

7. The apparatus for loading instructions as set forth in claim 2 wherein said instruction execution pipeline comprises an address generation circuit capable of selecting and retrieving addresses from said first state information and from said second state information according to at least one thread status bit associated with said instructions in said first and second instruction threads.

8. The apparatus for loading instructions as set forth in claim 1 wherein said branch instruction detection circuit is further capable of detecting a branch instruction in said second instruction thread and, in response to said detection, causing said instruction loading circuit to stop loading instructions from said second instruction thread into said instruction execution pipeline and causing said instruction loading circuit to begin loading instructions from said first instruction thread into said instruction execution pipeline.

9. A processing system comprising:
   a data processor comprising an instruction execution pipeline and an apparatus for loading instructions into said instruction execution pipeline comprising:
      an instruction loading circuit capable of loading instructions from a first instruction thread into said instruction execution pipeline; and
      a branch instruction detection circuit capable of detecting a branch instruction in said first instruction thread and, in response to said detection, causing said instruction loading circuit to stop loading instructions from said first instruction thread into said instruction execution pipeline and causing said instruction loading circuit to begin loading instructions from a second instruction thread into said instruction execution pipeline, wherein said second instruction thread is not a target of said branch instruction in said first instruction thread; and
   a L2 cache associated with said data processor; and
   a system memory coupled to said data processor.

10. The processing system as set forth in claim 9 further comprising a first state table capable of storing first state information associated with said first instruction thread and a second state table capable of storing second state information associated with said second instruction thread.

11. The processing system as set forth in claim 10 wherein said instruction execution pipeline comprises a plurality of execution units capable of selecting and retrieving said first state information from said first state table and using said first state information to execute instructions in said first instruction thread.

12. The processing system as set forth in claim 11 wherein said plurality of execution units selects and retrieves said first state information according to at least one thread status bit associated with said instructions in said first instruction thread.

13. The processing system as set forth in claim 10 wherein said instruction execution pipeline comprises a plurality of execution units capable of selecting and retrieving said second state information from said second state table and using said second state information to execute instructions in said second instruction thread.

14. The processing system as set forth in claim 13 wherein said plurality of execution units selects and retrieves said second state information according to at least one thread status bit associated with said instructions in said second instruction thread.

15. The processing system as set forth in claim 10 wherein said instruction execution pipeline comprises an address generation circuit capable of selecting and retrieving addresses from said first state information and from said second state information according to at least one thread status bit associated with said instructions in said first and second instruction threads.

16. The processing system as set forth in claim 9 wherein said branch instruction detection circuit is further capable of detecting a branch instruction in said second instruction thread and, in response to said detection, causing said instruction loading circuit to stop loading instructions from said second instruction thread into said instruction execution pipeline and causing said instruction loading circuit to begin loading instructions from said first instruction thread into said instruction execution pipeline.

17. For use in a pipelined processor comprising an instruction execution pipeline, a method of loading instructions into the instruction execution pipeline comprising the steps of:
   loading instructions from a first instruction thread into the instruction execution pipeline;
   detecting a branch instruction in the first instruction thread; and in response to the detection of the branch instruction, stopping loading instructions from the first instruction thread into the instruction execution pipeline and loading instructions from a second instruction thread into the instruction execution pipeline, wherein the second instruction thread is not a target of the branch instruction in the first instruction thread.

18. The method as set forth in claim 17 including the further step of detecting a branch instruction in the second instruction thread.

19. The method as set forth in claim 18 including, in response to the detection of the branch instruction in the second instruction thread, the further steps of:

stopping loading instructions from the second instruction thread into the instruction execution pipeline; and loading instructions from the first instruction thread into the instruction execution pipeline.

20. The method as set forth in claim 17 including the further steps of:

resolving the branch instruction in the first instruction thread to thereby determine a target branch address;

in response to the resolution of the branch instruction, stopping loading instructions from the second instruction thread into the instruction execution pipeline; and resuming loading instructions from the first instruction thread at the target branch address into the instruction execution pipeline.

* * * * *